United States Patent
Kimura et al.

(10) Patent No.: US 9,933,530 B2
(45) Date of Patent: Apr. 3, 2018

(54) PHOTON DETECTOR, RADIATION ANALYZER, AND COMPUTER PROGRAM PRODUCT

(71) Applicant: KABUSHIKI KAISHA TOSHIBA, Tokyo (JP)

(72) Inventors: Shunsuke Kimura, Kanagawa (JP); Hideyuki Funaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 15/045,713

(22) Filed: Feb. 17, 2016

(65) Prior Publication Data
US 2016/0274251 A1    Sep. 22, 2016

(30) Foreign Application Priority Data
Mar. 19, 2015    (JP) ................. 2015-056459

(51) Int. Cl.
*H01J 40/14* (2006.01)
*G01T 1/208* (2006.01)
*G01T 1/175* (2006.01)

(52) U.S. Cl.
CPC .............. *G01T 1/208* (2013.01); *G01T 1/175* (2013.01)

(58) Field of Classification Search
CPC ....... G01T 1/2928; G01T 1/247; G01T 1/175; G01T 1/208; G03G 15/05; A61B 6/4241
See application file for complete search history.

(56) References Cited

U.S. PATENT DOCUMENTS 6,410,903 B1 * 6/2002 Miyazaki ............... G01R 19/04
                                                                                      250/214 R
8,664,615 B2    3/2014   Amitani et al.

FOREIGN PATENT DOCUMENTS

| JP | 2-126710 | 5/1990 |
|----|----------|--------|
| JP | 4-278738 | 10/1992 |
| JP | 5505418 | 5/2014 |

* cited by examiner

*Primary Examiner* — Don Wong
(74) *Attorney, Agent, or Firm* — Finnegan, Henderson, Farabow, Garrett & Dunner, L.L.P.

(57) ABSTRACT

According to an embodiment, a photon detector includes a photoelectric converter, a voltage supplier, a potential variation detector, and an adjustor. The photoelectric converter performs photoelectric conversion based on an incident photon and outputs current corresponding to number of photons. The voltage supplier supplies a voltage to the photoelectric converter. The potential variation detector detects potential variation of a cathode of the photoelectric converter. The adjustor adjusts a potential of an anode of the photoelectric converter based on the potential variation detected by the potential variation detector so that variation in a potential difference between the cathode and the anode of the photoelectric converter is reduced, and outputs current from the photoelectric converter to the outside.

5 Claims, 5 Drawing Sheets

PHOTON DETECTOR, RADIATION ANALYZER, AND COMPUTER PROGRAM PRODUCT

CROSS-REFERENCE TO RELATED APPLICATIONS

This application is based upon and claims the benefit of priority from Japanese Patent Application No. 2015-056459, filed on Mar. 19, 2015; the entire contents of which are incorporated herein by reference.

FIELD

An embodiment described herein relates generally to a photon detector, a radiation analyzer, and a computer program product.

BACKGROUND

Photon-counting-type radiation detection under high dose (under high counting) condition such as X-ray computed tomography (CT) requires measurement to be performed by making a photoelectric conversion gain of a detector constant in order to accurately measure energy of radiated photons.

However, high counting of a light source of radiated photons has caused electric charges charged in a power supply node to be extracted along current output from a detector resulting from photon incidence, and a power supply voltage of the detector to vary.

DETAILED DESCRIPTION

According to an embodiment, a photon detector includes a photoelectric converter, a voltage supplier, a potential variation detector, and an adjustor. The photoelectric converter performs photoelectric conversion based on an incident photon and outputs current corresponding to number of photons. The voltage supplier supplies a voltage to the photoelectric converter. The potential variation detector detects potential variation of a cathode of the photoelectric converter. The adjustor adjusts a potential of an anode of the photoelectric converter based on the potential variation detected by the potential variation detector so that variation in a potential difference between the cathode and the anode of the photoelectric converter is reduced, and outputs current from the photoelectric converter to the outside.

A photon detector 100 according to an embodiment will now be described with reference to the accompanying drawings.

Figure 1:
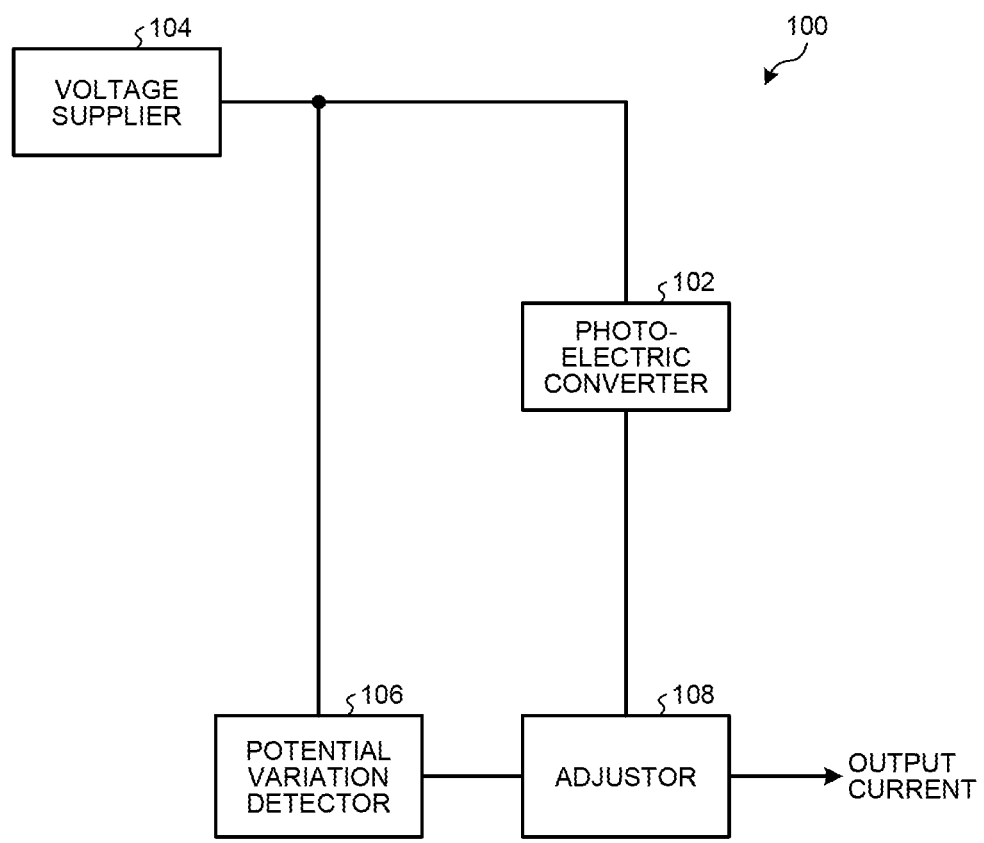
FIG. 1 is a view illustrating the configuration of a photon detector according to an embodiment.

FIG. 1 is a view illustrating the configuration of the photon detector 100 according to the embodiment. As illustrated in FIG. 1, the photon detector 100 includes a photoelectric converter (photon detector) 102, a voltage supplier 104, a potential variation detector 106, and an adjustor 108.

The photoelectric converter 102 is, for example, a silicon photomultiplier (SiPN) in which a plurality of avalanche photodiodes (APDs) respectively connected in series to quenching resistors are two-dimensionally disposed. The photoelectric converter 102 can count the number of photons (detect photons) by, for example, performing photoelectric conversion for generating a pulse (photon counter signal) that indicates an amount of electric charges corresponding to the number of incident photons and outputting current (signal current) combined with a pulse. The photoelectric converter 102 may be any other detector including a carrier multiplication mechanism such as a photomultiplier tube.

The voltage supplier 104 supplies a predetermined voltage to the photoelectric converter 102. The potential variation detector 106 detects potential variation of a cathode of the photoelectric converter 102. The adjustor 108 adjusts a potential of an anode of the photoelectric converter 102 based on the potential variation detected by the potential variation detector 106 so that variation in a potential difference between the cathode and the anode of the photoelectric converter 102 is reduced, and outputs the signal current output by the photoelectric converter 102 to the outside.

In a case where radiation is detected using the photon detector 100, the radiation is made incident to a phosphor such as a scintillator, and the photon detector 100 detects photons generated in the phosphor. The number of photons generated in a phosphor is proportional to energy of radiation made incident to the phosphor. Accordingly, the energy of radiation can be measured by counting pulses that are generated by an APD based on the number of photons generated in a phosphor.

Figure 2:
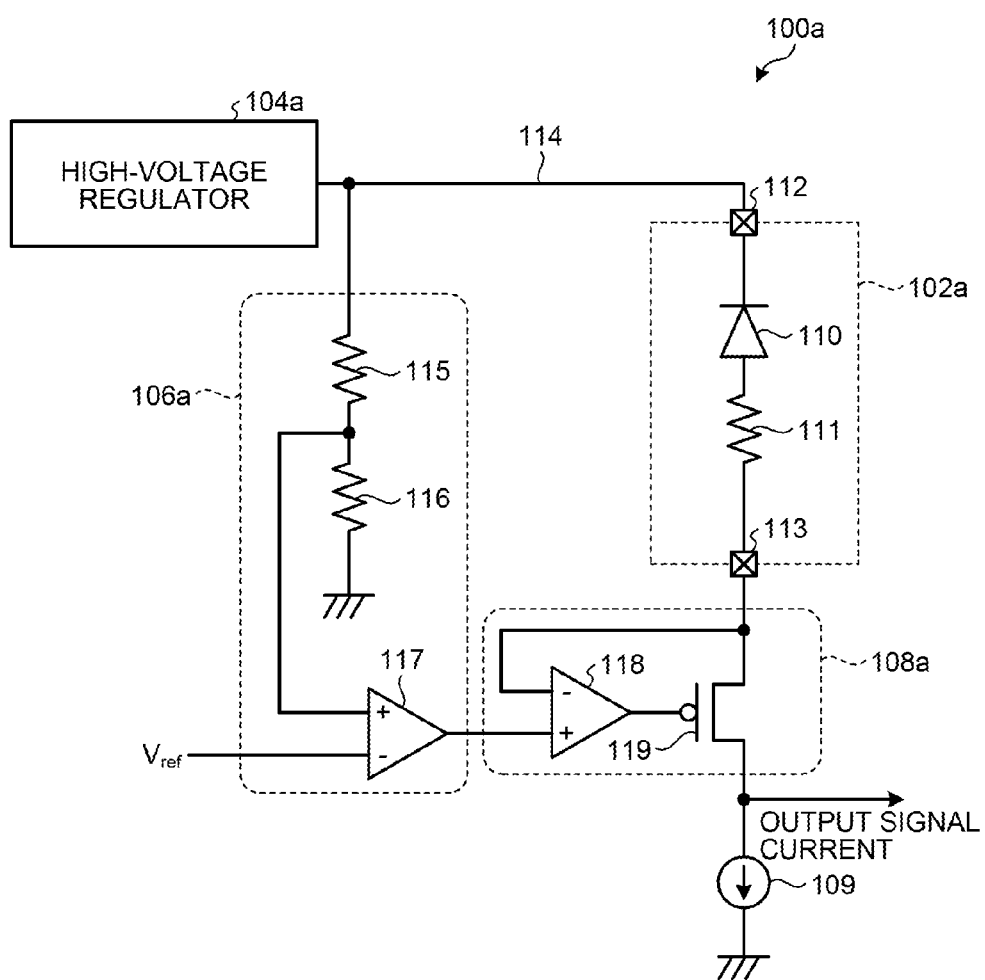
FIG. 2 is a view illustrating a specific configuration example of a photon detector according to the embodiment.

FIG. 2 is a view illustrating a specific configuration example of a photon detector 100a according to the embodiment. As illustrated in FIG. 2, the photon detector 100a includes, for example, a photoelectric converter 102a, a voltage supplier 104a, a potential variation detector 106a, an adjustor 108a, and a constant current source 109.

The photoelectric converter 102a includes one or more avalanche photodiodes (APD(s)) 110, and one or more quenching resistors 111 respectively connected in series to the APDs 110. When a reverse voltage equal to or higher than a breakdown voltage is applied from the voltage supplier 104a to a cathode (terminal) 112 of the photoelectric converter 102a through a power supply line 114, the photoelectric converter 102a performs photoelectric conversion for generating a pulse based on the incident photon, and outputs signal current indicating a photon detection result from an anode (terminal) 113 thereof.

FIG. 2 illustrates that the photoelectric converter 102a includes a set of the APD 110 and quenching resistor 111, but the photoelectric converter 102a may be configured as a SiPM including a plurality of sets of the APDs 110 and quenching resistors 111. For example, the photoelectric converter 102a is a photon counting device in which a plurality of individually operating avalanche photodiode (APD) pixels are two-dimensionally disposed and connected in parallel. When photons are detected, each of the APD pixels outputs a predetermined pulse regardless of the number of incident photons. Accordingly, the photoelectric converter 102a outputs current that becomes the total sum of pulses output by all APD pixels (current corresponding to the number of photons). In the photoelectric converter 102a, the number of APD pixels to which photons are made incident is regarded as the number of photons.

In a case where radiation is detected using the photon detector 100a, the radiation is made incident to a phosphor such as a scintillator, and the photon detector 100a detects photons generated by the phosphor. In this manner, the photoelectric converter 102a detects photons generated in a phosphor so as to form an indirect detector for indirectly detecting radiation made incident to the phosphor.

The voltage supplier 104a is, for example, a high-voltage regulator, and applies a voltage to the photoelectric converter 102a so that the photoelectric converter 102a operates in the Geiger mode where a reverse voltage is set to a voltage equal to or higher than a breakdown voltage. A cathode potential $V_K$ of the photoelectric converter 102a is determined in accordance with an output voltage of the voltage supplier 104a. In the photon detector 100a, the potential difference between the cathode and the anode of the photoelectric converter 102a is defined as described later.

The photoelectric converter 102a outputs pulses (current I) resulting from incident photons, but electric charges charged in a cathode end (power supply) are discharged, and thus the cathode potential $V_K$ is lowered by a potential variation amount $\Delta V$.

The potential variation detector 106a includes a resistance voltage divider formed by a resistor 115 having a resistance value of R1 and a resistor 116 having a resistance value of R2, and an amplifier 117 for detecting a voltage. The amplifier 117 receives a detection voltage $V_{sense}$ obtained by dividing a voltage of the cathode of the photoelectric converter 102a with the resistor 115 and the resistor 116, and a reference voltage $V_{ref}$. The detection voltage $V_{sense}$ is represented by the following Expression (1).

$$V_{sense}=V_K \times R2/(R1+R2) \tag{1}$$

When a gain of the amplifier 117 is set to (R1+R2)/R2, an output voltage of the amplifier 117 (input voltage $V_{reg}$ to an amplifier 118, which will be described later) is represented by the following Expression (2).

$$V_{reg}=V_K-V_{ref} \tag{2}$$

A potential of the power supply line 114 that varies depending on the current output from the photoelectric converter 102a due to the incident photons is divided by the resistor 115 and the resistor 116. In other words, when the cathode potential $V_K$ is lowered by the potential variation amount $\Delta V$, the detection voltage $V_{sense}$ varies as represented in the following Expression (3).

$$V_{sense}=(V_K-\Delta V) \times R2/(R1+R2) \tag{3}$$

Accordingly, the potential variation amount $\Delta V$ is reflected in an output voltage of the amplifier 117 (input voltage $V_{reg}$ to the amplifier 118, which will be described later) as represented in the following Expression (4).

$$V_{reg}=(V_K-\Delta V)-V_{ref} \tag{4}$$

The adjustor 108a includes the amplifier 118 for regulation that adjusts a potential of the anode of the photoelectric converter 102a, and a transistor 119. In the adjustor 108a, the amplifier 118 includes a low-impedance input node and adjusts a potential of the anode of the photoelectric converter 102a, and the transistor 119 outputs signal current input from the photoelectric converter 102a to the outside.

An anode potential $V_A$ of the photoelectric converter 102a is determined in accordance with the input voltage to the amplifier 118. In other words, the anode potential $V_A$ of the photoelectric converter 102a and the input voltage $V_{reg}$ to the amplifier 118 become identical. The input voltage $V_{reg}$ to the amplifier 118 is defined by the potential variation detector 106a as described above.

Figure 3A:
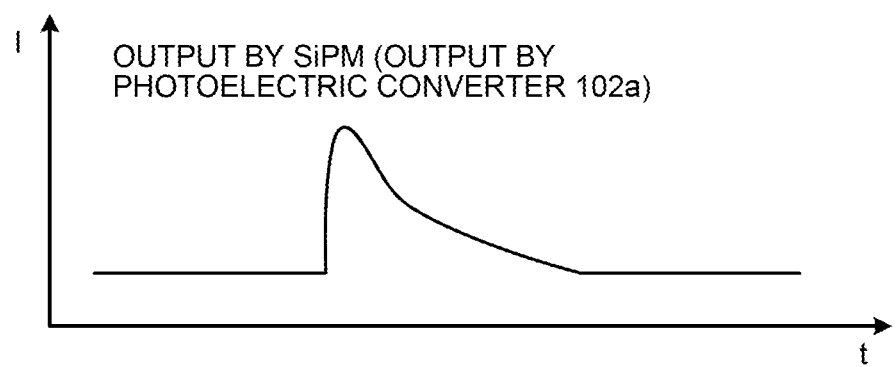
FIGS. 3A and 3B are timing charts illustrating output current, a cathode potential, and an anode potential.
Figure 3B:
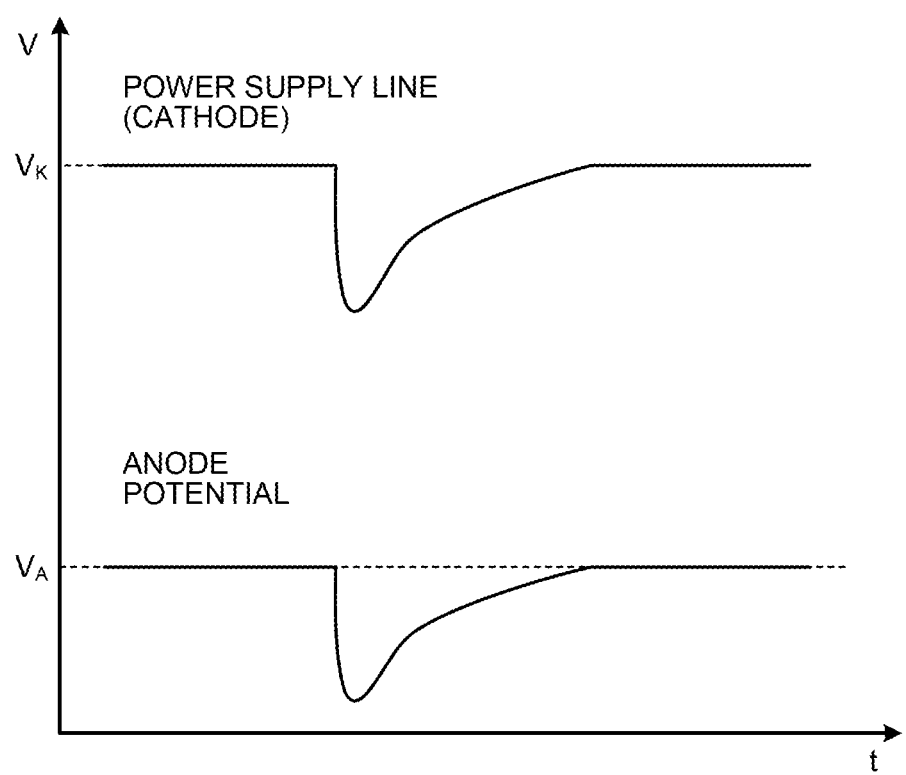

FIGS. 3A and 3B are timing charts illustrating the cathode potential $V_K$ and the anode potential $V_A$ when the photoelectric converter 102a outputs the current I resulting from incident photons. When the current I resulting from incident photons output by the photoelectric converter 102a (see FIG. 3A) causes the cathode potential $V_K$ of the photoelectric converter 102a to vary by the potential variation amount $\Delta V$, the photon detector 100a causes the anode potential $V_A$ of the photoelectric converter 102a to vary by the potential variation amount $\Delta V$ (see FIG. 3B).

In other words, the photon detector 100a controls the anode potential $V_A$ while tracking the variation of the cathode potential $V_K$, and reduces variation in a potential difference between the anode and the cathode even when the photoelectric converter 102a outputs current resulting from incident photons. When the variation in a potential difference between the anode and the cathode is reduced, the variation in a photoelectric conversion gain of the photoelectric converter 102a is reduced, and the photon detector 100a can improve a signal-to-noise (SN) ratio to detect photons. In the photon detector 100a, controlling a potential of the reference voltage $V_{ref}$ causes the input voltage $V_{reg}$ to the amplifier 118 (in other words, the anode potential $V_A$) to be controlled, and a voltage applied between the anode and the cathode of the photoelectric converter 102a to be determined.

The potential variation detector 106a and the adjustor 108a may perform digital processing so as to adjust the anode potential $V_A$ of the photoelectric converter 102a. For example, the potential variation detector 106a may analog-to-digital-convert (A/D-convert) and output the input voltage $V_{reg}$ to the amplifier 118 with an analog-to-digital (A/D) converter. The adjustor 108a may include a central processing unit (CPU), memory and the like, and execute a control program including a step for adjusting a potential of the anode of the photoelectric converter 102a with the input voltage $V_{reg}$ of a digital value so that a CPU reduces variation in a potential difference between the cathode and the anode of the photoelectric converter 102. In this case, the adjustor 108a outputs, for example, the same signal as that of the amplifier 118 to the transistor 119 with a digital-to-analog (D/A) converter.

EXAMPLE

Figure 4:
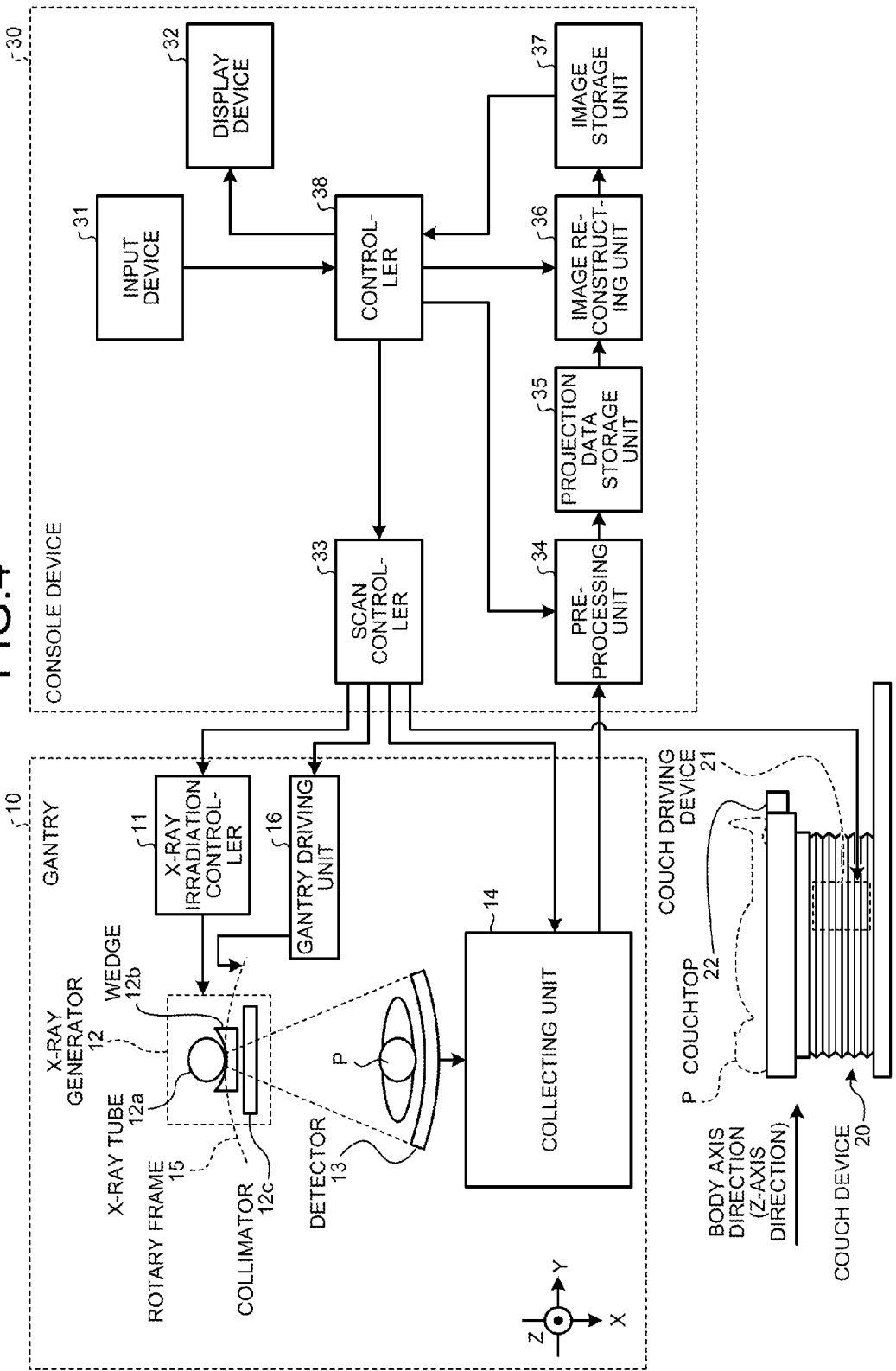
FIG. 4 is a view illustrating a configuration example of a radiation analyzer that includes the photon detector.
Figure 5:
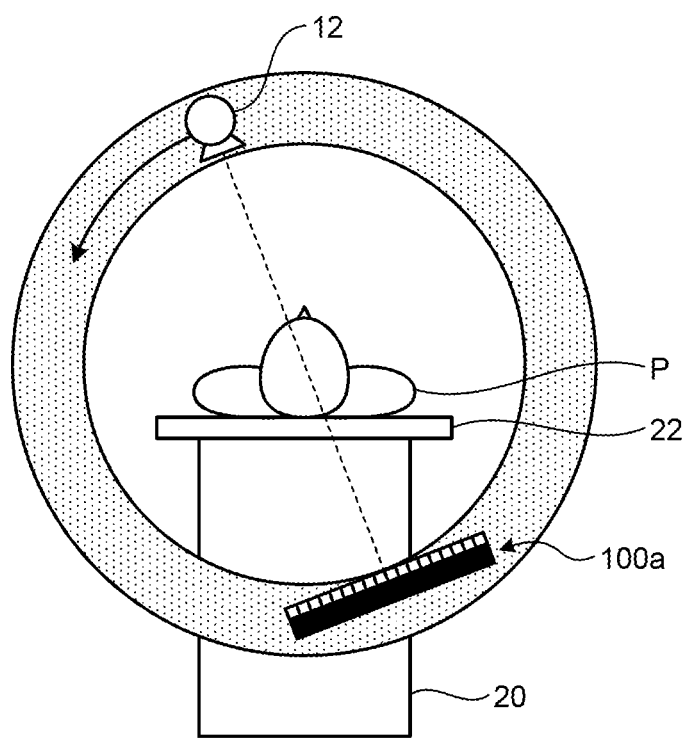
FIG. 5 is a schematic view schematically illustrating a position of the photon detector in the radiation analyzer.

The following describes a radiation analyzer that includes the photon detector 100a functioning as a radiation detector. FIG. 4 is a view illustrating a configuration example of a radiation analyzer that includes the photon detector 100a. FIG. 5 is a schematic view schematically illustrating a position of the photon detector 100a in the radiation analyzer illustrated in FIG. 4. The radiation analyzer is an X-ray computed tomography (CT) device capable of executing photon counting computed tomography (CT). Specifically, the radiation analyzer includes the photon detector 100a, and is a device capable of reconstructing X-ray computed tomography (CT) image data having a high SN ratio by counting photons derived from X-rays that transmit through a subject with photon counting.

Individual photons have different energy. In the photon counting CT, information on an energy component of X-rays can be obtained by measuring an energy value of photons. In the photon counting CT, data collected by irradiating a subject with X-rays at one kind of tube voltage is divided into a plurality of energy components so as to be imaged.

As illustrated in FIG. 4, the radiation analyzer includes a gantry 10, a couch device 20, and a console device 30.

The gantry 10 is a device for irradiating a subject P with X-rays and counting the X-rays that transmit through the subject P, and includes an X-ray irradiation controller 11, an X-ray generator 12, a detector 13 (including the photon detector 100a), a collecting unit 14, a rotary frame 15, and a gantry driving unit 16.

The rotary frame 15 supports the X-ray generator 12 and the detector 13 so that the X-ray generator 12 and the detector 13 face each other across the subject P, and is an annular frame that is driven to rotate at high speed on a circular path centering the subject P by the gantry driving unit 16, which will be described later.

The X-ray generator (radiation source) 12 is a device for generating X-rays and irradiating the subject P with the generated X-rays, and includes an X-ray tube 12a, wedges 12b, and a collimator 12c.

The X-ray tube 12a is a vacuum tube for irradiating the subject P with X-ray beams at a high voltage supplied from the X-ray irradiation controller 11, which will be described later, and irradiates the subject P with X-ray beams along with the rotation of the rotary frame 15. The X-ray tube 12a generates the expanding X-ray beams with a fan angle and a cone angle.

The wedge 12b is an X-ray filter for adjusting an X-ray amount of X-rays emitted from the X-ray tube 12a. Specifically, the wedge 12b is a filter for transmitting and attenuating X-rays emitted from the X-ray tube 12a so that the X-rays emitted from the X-ray tube 12a to the subject P are distributed as previously specified.

For example, the wedge 12b is a filter obtained by processing aluminum to have a predetermined target angle and predetermined thickness. A wedge may also be referred to as a wedge filter and as a bow-tie filter. The radiation analyzer includes a plurality of kinds of wedges 12b that are switched depending on photographing conditions. For example, the X-ray irradiation controller 11, which will be described later, switches the wedges 12b depending on photographing conditions. For example, the X-ray generator 12 includes two kinds of wedges.

The collimator 12c is a slit for narrowing down an irradiation range of X-rays whose amount is adjusted by the wedges 12b under the control of the X-ray irradiation controller 11, which will be described below.

The X-ray irradiation controller 11 is a device for supplying a high voltage to the X-ray tube 12a as a high voltage generator. The X-ray tube 12a generates X-rays using a high voltage supplied form the X-ray irradiation controller 11. The X-ray irradiation controller 11 adjusts a tube voltage and tube current supplied to the X-ray tube 12a so as to adjust an amount of X-rays with which the subject P is irradiated.

The X-ray irradiation controller 11 switches the wedges 12b. The X-ray irradiation controller 11 adjusts the aperture of the collimator 12c so as to adjust an X-ray irradiation range (fan angle and cone angle). The radiation analyzer may allow an operator to manually switch a plurality of kinds of wedges.

The gantry driving unit 16 rotates the rotary frame 15 to swivel the X-ray generator 12 and the detector 13 on a circular path centering the subject P.

The detector 13 includes the photon detector 100a at a position illustrated in FIG. 5, and outputs, whenever an X-ray is made incident, a signal capable of measuring an energy value of the X-ray. The photon detector 100a detects a photon generated by an X-ray made incident to an unillustrated phosphor using the APD pixels. X-rays are, for example, emitted from the X-ray tube 12a and transmit through the subject P. The radiation analyzer performs arithmetic processing so as to measure an energy value of radiation detected by the photon detector 100a.

The collecting unit 14 (see FIG. 4) collects counting information that is a result of counting operation with an output signal of the detector 13. In other words, the collecting unit 14 discriminates individual signals output from the detector 13, and collects the counting information. The counting information is information that is collected from individual signals output from the detector 13 whenever an X-ray emitted from the X-ray tube 12a and transmitting through the subject P is made incident. Specifically, the counting information is information in which a counted value and an energy value of X-rays made incident to the detector 13 are associated with each other. The collecting unit 14 transmits the collected counting information to the console device 30.

The couch device 20 is a device on which the subject P is lying, and includes a couchtop 22 and a couch driving device 21. The couchtop 22 is a plate on which the subject P is lying. The couch driving device 21 moves the couchtop 22 in the z-axis direction and moves the subject P in the rotary frame 15.

The gantry 10 executes, for example, a helical scan of spirally scanning the subject P by rotating the rotary frame 15 while the couchtop 22 is moved. The gantry 10 executes a conventional scan of scanning the subject P on a circular path by rotating the rotary frame 15 while a position of the subject P is fixed after movement of the couchtop 22. Alternatively, the gantry 10 executes a step-and-shoot method of performing the conventional scan in a plurality of scan areas by moving a position of the couchtop 22 at predetermined intervals.

The console device 30 is a device that receives operation of the radiation analyzer operated by an operator and reconstructs X-ray CT image data using the counting information collected by the gantry 10. The console device 30 includes an input device 31, a display device 32, a scan controller 33, a preprocessing unit 34, a projection data storage unit 35, an image reconstructing unit 36, an image storage unit 37, and a controller 38.

The input device 31 includes a mouse, a keyboard and the like used for inputting various kinds of instructions and various kinds of settings by an operator of the radiation analyzer, and transfers information on the instruction and setting received from an operator to the controller 38. For example, the input device 31 receives photographing conditions of X-ray CT image data, reconstructing conditions in reconstructing X-ray CT image data, image processing conditions on X-ray CT image data and the like from an operator.

The display device 32 is a monitor referred to by an operator, and, under the control of the controller 38, displays X-ray CT image data to an operator and displays graphical user interfaces (GUIs) for receiving various kinds of instructions and various kinds of settings from an operator through the input device 31.

Under the control of the controller 38, which will be described later, the scan controller 33 controls the operation of the X-ray irradiation controller 11, the gantry driving unit 16, the collecting unit 14, and the couch driving device 21 so as to control collection of the counting information in the gantry 10.

The preprocessing unit 34 performs correction operations such as logarithmic conversion, offset correction, sensitivity correction, and beam hardening correction on the counting information transmitted from the collecting unit 14 so as to generate projection data.

The projection data storage unit 35 stores therein the projection data generated by the preprocessing unit 34. In other words, the projection data storage unit 35 stores therein projection data for reconstructing X-ray CT image data (corrected counting information). Hereinafter, the projection data may be described as the counting information.

The image reconstructing unit 36 uses the projection data stored in the projection data storage unit 35 to reconstruct X-ray CT image data. Various kinds of methods are developed as the reconstructing method, for example, back projection method. Examples of the back projection method includes the filtered back projection (FBP). The image reconstructing unit 36 performs various kinds of image processing on X-ray CT image data so as to generate image data. The image reconstructing unit 36 stores the reconstructed X-ray CT image data and image data generated by performing various kinds of image processing, in the image storage unit 37.

The projection data generated from the counting information obtained by the photon counting CT includes energy information of X-rays attenuated by transmitting through the subject P. Accordingly, the image reconstructing unit 36 can reconstruct, for example, X-ray CT image data of specific energy components. The image reconstructing unit 36 can also reconstruct, for example, X-ray CT image data of each of a plurality of energy components.

The image reconstructing unit 36 also allocates, for example, a color tone corresponding to each energy component to each pixel in the X-ray CT image data of the energy component so as to generate a plurality of pieces of X-ray CT image data that is color coded according to the energy components. In addition, the image reconstructing unit 36 can generate image data by superposing these pieces of X-ray CT image data.

The image reconstructing unit 36 utilizes K-edge inherent to a substance so as to generate image data capable of identifying the substance. Since attenuation coefficients of an X-ray are greatly different above and below K-edge, and the counted values largely vary as well. For example, the image reconstructing unit 36 generates differential image data, which represents the difference between image data in which the counting information of the energy area below K-edge is reconstructed and image data in which the counting information of the energy area above K-edge is reconstructed. For example, differential image data generated using K-edge of a main component of a radiopaque dye represents an image mainly demonstrating the area in which the radiopaque dye is present. Examples of other types of image data generated by the image reconstructing unit 36 include monochromatic X-ray image data, density image data, and effective atomic number image data.

The controller 38 controls the operations of the gantry 10, the couch device 20, and the console device 30 so as to control the whole radiation analyzer. Specifically, the controller 38 controls the scan controller 33 so as to control the CT scanning performed on the gantry 10. The controller 38 also controls the preprocessing unit 34 and the image reconstructing unit 36 so as to control the image reconstructing operation and image generating operation performed in the console device 30. The controller 38 controls the display device 32 to display various kinds of image data stored in the image storage unit 37.

The photon detector 100a can also be used in devices other than the X-ray CT device described above. For example, the photon detector 100a can be used in a nuclear medical imaging device such as an X-ray diagnostic device, a position emission computed tomography (PET) device, and a single photon emission computed tomography (SPECT) device, and a "PET-CT device" and a "SPECT-CT device" configured by integrating an X-ray CT device and a nuclear medical imaging device. The photon detector 100a can be used as a light receiving unit of a PET device, and may configure a device in combination a with magnetic resonance imaging (MRI) device.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A photon detector comprising:
   a photoelectric converter performing photoelectric conversion based on an incident photon and output current corresponding to number of photons;
   a voltage supplier supplying a voltage to the photoelectric converter;
   a potential variation detector detecting potential variation of a cathode of the photoelectric converter; and
   an adjustor adjusting a potential of an anode of the photoelectric converter based on the potential variation detected by the potential variation detector so that variation in a potential difference between the cathode and the anode of the photoelectric converter is reduced, and outputting current from the photoelectric converter to the outside.

2. The detector according to claim 1, wherein the photoelectric converter includes one or more avalanche photodiodes.

3. A radiation analyzer comprising:
   a radiation source; and
   the photon detector according to claim 2, wherein the photon detector detects photons resulting from radiation emitted from the radiation source.

4. A radiation analyzer comprising:
   a radiation source; and
   a photon detector detects photons resulting from radiation emitted from the radiation source, wherein
   the photon detector comprising:
   a photoelectric converter performing photoelectric conversion based on an incident photon and output current corresponding to number of photons;
   a voltage supplier supplying a voltage to the photoelectric converter;
   a potential variation detector detecting potential variation of a cathode of the photoelectric converter; and
   an adjustor adjusting a potential of an anode of the photoelectric converter based on the potential variation detected by the potential variation detector so that variation in a potential difference between the cathode and the anode of the photoelectric converter is reduced, and outputting current from the photoelectric converter to the outside.

5. A computer program product comprising a computer-readable medium including programmed instructions that causes a computer to execute:

performing photoelectric conversion based on an incident photon; and adjusting, when a potential of a cathode of a photoelectric converter outputting current corresponding to number of photons varies, a potential of an anode of the photoelectric converter based on the variation in the potential of the cathode of the photoelectric converter so that variation in a potential difference between the cathode and the anode of the photoelectric converter is reduced, and outputting current output from the photoelectric converter to the outside.

* * * * *